US012009574B2

(12) United States Patent
Franson

(10) Patent No.: US 12,009,574 B2
(45) Date of Patent: Jun. 11, 2024

(54) INTEGRATED ANTENNA ARRAY WITH BEAMFORMER IC CHIPS HAVING MULTIPLE SURFACE INTERFACES

(71) Applicant: VIASAT, INC., Carlsbad, CA (US)

(72) Inventor: Steven J. Franson, Scottsdale, AZ (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/252,148

(22) PCT Filed: Nov. 13, 2020

(86) PCT No.: PCT/US2020/060599
§ 371 (c)(1),
(2) Date: May 8, 2023

(87) PCT Pub. No.: WO2022/103402
PCT Pub. Date: May 19, 2022

(65) Prior Publication Data
US 2023/0327320 A1 Oct. 12, 2023

(51) Int. Cl.
*H01Q 1/22* (2006.01)
*H01Q 1/48* (2006.01)
(Continued)

(52) U.S. Cl.
CPC ............. *H01Q 1/2283* (2013.01); *H01Q 1/48* (2013.01); *H01Q 3/38* (2013.01); *H01Q 9/0407* (2013.01)

(58) Field of Classification Search
None
See application file for complete search history.

(56) References Cited

U.S. PATENT DOCUMENTS 6,166,705 A 12/2000 Mast et al.
10,056,922 B1 8/2018 Tsvelykh et al.
(Continued)

FOREIGN PATENT DOCUMENTS

EP 3736910 11/2020
JP 2013-110434 A2 6/2013
(Continued)

OTHER PUBLICATIONS

KR102061620B! translation (Year: 2020).*
(Continued)

*Primary Examiner* — Whitney Moore
(74) *Attorney, Agent, or Firm* — F. CHAU & ASSOCIATES, LLC

(57) ABSTRACT

An antenna apparatus includes an antenna substrate having opposite first and second surfaces, and at least one antenna element disposed at the first surface. At least one radio frequency integrated circuit (RFIC) chip has a lower surface attached to the second surface of the antenna substrate and has an RF contact coupled to the at least one antenna element through the antenna substrate. The RFIC chip has an RF signal conductor at an upper surface thereof and beam-forming circuitry coupled between the RF contact and the RF signal conductor. A transmission line section has a lower surface attached to the second surface of the antenna substrate, and has an upper surface at which a transmission line conductor is disposed and electrically connected to the RF signal conductor of the RFIC chip through an upper surface interconnect.

20 Claims, 15 Drawing Sheets

(51) Int. Cl.
*H01Q 3/38* (2006.01)
*H01Q 9/04* (2006.01)

(56) References Cited

U.S. PATENT DOCUMENTS

| | | | | |
|---|---|---|---|---|
| 2013/0207274 | A1 | 8/2013 | Liu et al. | |
| 2014/0145884 | A1* | 5/2014 | Dang | H01Q 1/38 343/700 MS |
| 2016/0056544 | A1 | 2/2016 | Garcia et al. | |
| 2019/0036215 | A1* | 1/2019 | Shahmohammadian | H01Q 3/40 |
| 2020/0403299 | A1* | 12/2020 | Gupta | H01L 23/5389 |
| 2020/0412021 | A1* | 12/2020 | Chang | H01Q 5/371 |
| 2021/0005977 | A1* | 1/2021 | Franson | H01Q 21/065 |
| 2021/0050312 | A1* | 2/2021 | Franson | H01L 24/13 |

FOREIGN PATENT DOCUMENTS

| | | |
|---|---|---|
| KR | 10-2061620 | 12/2019 |
| WO | WO2012014527 A1 | 2/2012 |

OTHER PUBLICATIONS

International Search Report dated Jul. 20, 2021 in corresponding PCT Application No. PCT/US2020/060599 (12 pages).

International Preliminary Report on Patentability dated Oct. 21, 2022 in corresponding PCT Application No. PCT/US2020/060599 (20 pages).

* cited by examiner

INTEGRATED ANTENNA ARRAY WITH BEAMFORMER IC CHIPS HAVING MULTIPLE SURFACE INTERFACES

CROSS REFERENCE TO RELATED APPLICATION

This application is a 371 National Stage entry of PCT application no. PCT/US2020/060599, filed on Nov. 13, 2020, the entire content of which is incorporated by reference herein.

TECHNICAL FIELD

This disclosure relates generally to antenna arrays integrated with distributed beamformer integrated circuit (IC) chips.

DISCUSSION OF RELATED ART

Antenna arrays are in widespread use today in diverse applications at microwave and millimeter wave frequencies, such as in aircraft, satellites, vehicles, watercraft, and base stations for general land-based communications. Such antenna arrays typically include microstrip radiating elements driven with phase shifting beamforming circuitry to generate a phased array for beam steering. It is typically desirable for an entire antenna system, including the antenna array and beamforming circuitry, to occupy minimal space with a low profile.

An integrated antenna array may be defined as an antenna array constructed with antenna elements integrated with radio frequency (RF) integrated circuit chips (RFICs) (interchangeably called "beamformer ICs" (BFICs)) in a compact structure. An integrated antenna array may have a sandwich type configuration in which the antenna elements are disposed in an exterior facing component layer and the RFICs are distributed across the effective antenna aperture within a proximate, parallel component layer behind the antenna element layer. The RFICs may include RF power amplifiers (PAs) for transmit and/or low noise amplifiers (LNAs) for receive and/or phase shifters for beam steering. By distributing PAs/LNAs in this fashion, higher efficiency on transmit and/or improved noise performance on receive are attainable, along with higher reliability relative to non-distributed IC designs.

SUMMARY

In an aspect of the present disclosure, an antenna apparatus includes an antenna substrate having opposite first and second surfaces. At least one antenna element is disposed at the first surface of the antenna substrate. At least one radio frequency integrated circuit (RFIC) chip has a lower surface attached to the second surface of the antenna substrate and has an RF contact coupled to the at least one antenna element through the antenna substrate. The at least one RFIC chip has an RF signal conductor at an upper surface thereof and beamforming circuitry coupled between the RF contact and the RF signal conductor. A transmission line section has a lower surface attached to the second surface of the antenna substrate, and has an upper surface at which a transmission line conductor is disposed and connected to the RF signal conductor of the RFIC chip through an upper surface interconnect such as a wirebond, ribbon bond or edge contact pair.

Thereby, the at least one RFIC chip within an integrated antenna structure has multiple surface interfaces, which may lead to performance and manufacturing advantages for the antenna apparatus.

A phased array antenna embodiment includes a plurality of antenna elements disposed at the first surface of the antenna substrate; and a plurality of RFIC chips each having a lower surface attached to the antenna substrate's second surface and an RF contact each coupled to at least one of the antenna elements. Each RFIC chip has an RF signal conductor at its upper surface and beamforming circuitry for beam steering coupled between the respective RF contact and the RF signal conductor. At least one transmission line section is disposed between the RFIC chips, and has a plurality of branch arm conductors of a beamforming network (BFN) at its upper surface, each connected to an RF signal conductor of a respective one of the RFIC chips through an upper surface interconnect.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Figure 1:
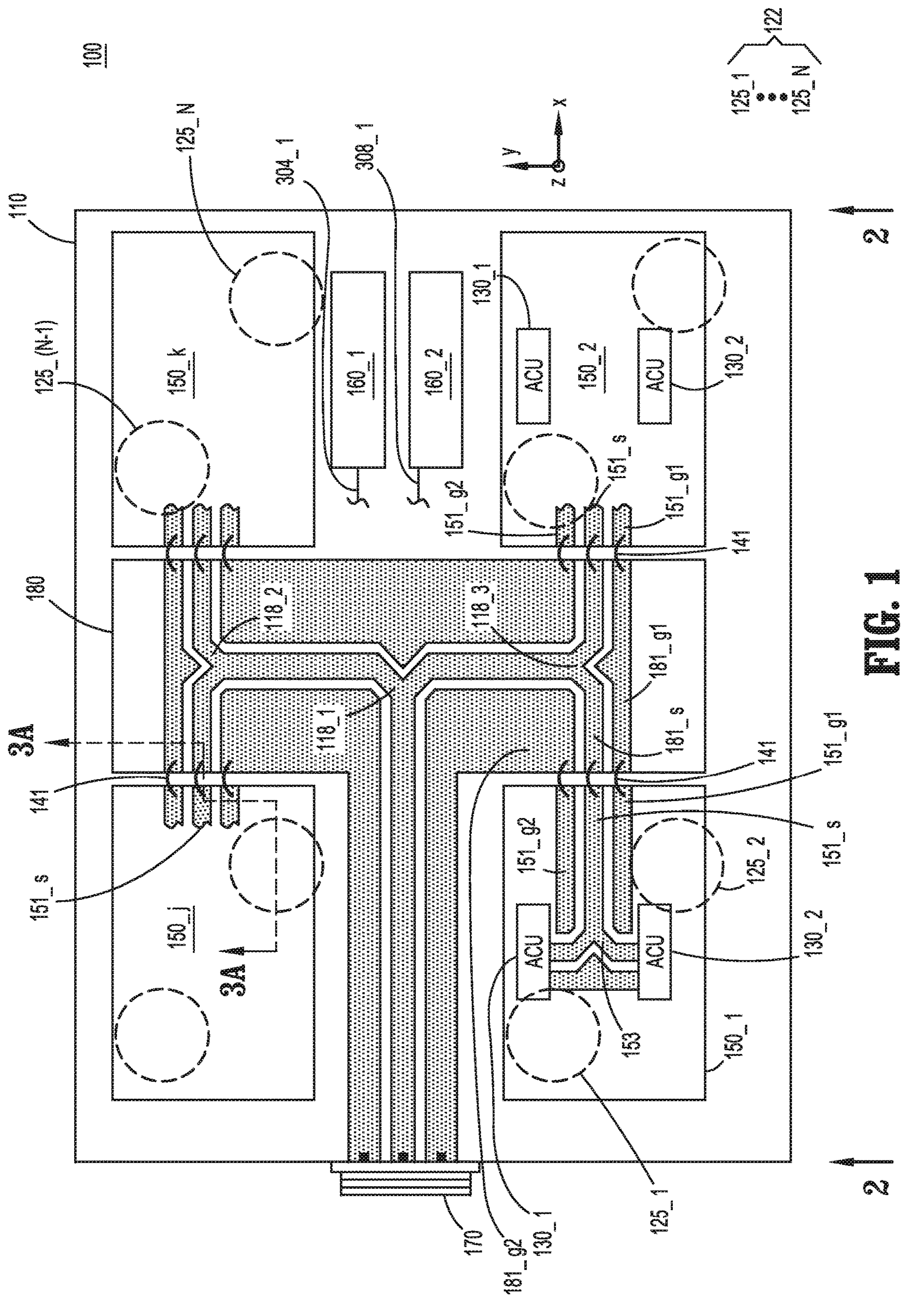
FIG. 1 is a top plan view of an example antenna apparatus according to an embodiment.
Figure 2:
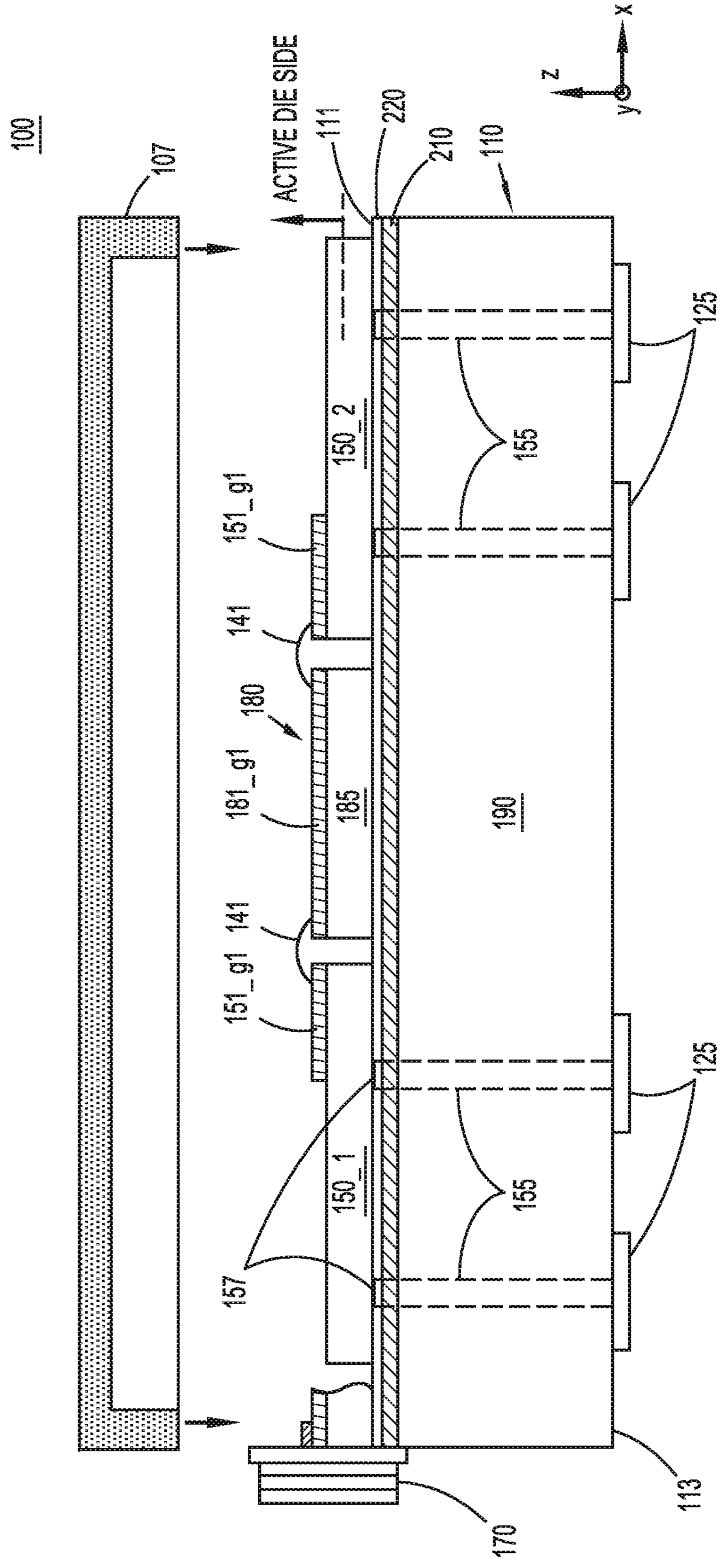
FIG. 2 is a front side view of the antenna apparatus of FIG. 1.

FIG. 1 is a top plan view of an example antenna apparatus 100 according to an embodiment, and FIG. 2 is a front side view of antenna apparatus 100. Referring collectively to FIGS. 1 and 2, antenna apparatus 100 (hereafter, "antenna 100") includes an antenna substrate 110 having an upper surface 111 upon which multiple radio frequency integrated circuit (RFIC) chips 150_1 to 150_K are attached. (Note that RFIC chips 150 may also be called beamformer IC (BFIC) chips, interchangeably.) N antenna elements 125_1 to 125_N forming a planar array 122 may be disposed at a lower surface 113 of antenna substrate 110. Each antenna element 125_*i* is coupled to an RFIC chip 150_*j* (i, j=any integer) through a via 155 (forming a probe feed) and an RF contact 157 at the lower surface of RFIC chip 150_*j*. Each RF contact 157 is in turn coupled to an RF signal conductor 151_*s* at an upper surface of RFIC chip 150_*j* through beamforming circuitry that includes one or more active circuit units (ACUs) such as 130_1, 130_2. The values of integers K and N may differ from embodiment to embodiment depending on the application. In the following discussion (and as shown in FIGS. 1-2), a "small array" example in which K=4 and N=8 will be discussed for simplicity of understanding.

Antenna substrate 110 may include a dielectric layer 190, a ground plane 210 for reflecting signal energy from antenna elements 125, and a layer region 220 ("redistribution layer (RDL) layer") including conductive lines for DC and/or control signals supplied to RFIC chips 150. At least one transmission line ("TL") section 180 has a lower surface attached to upper surface 111 of antenna substrate 110. TL section 180 has an upper surface at which a signal conductor 181_*s* of the transmission line is disposed and coupled at K locations to RF signal conductors 151_*s* through respective upper surface interconnects ("USINs") 141. (Each of the K locations of signal conductor 181_*s* may be referred to as a branch arm of a combiner/divider.) An USIN 141 is an interconnect made directly between conductors at the upper surfaces of an RFIC chip 150 and TL section 180. Thus, an USIN 141 does not include vias in either the RFIC chip 150 or TL section 180 to interconnect conductors 151, 181 at the upper surfaces through conductive elements within antenna substrate 110. Some examples of an USIN 141 include a wirebond, a ribbon bond, and an edge contact pair (an edge contact on RFIC chip 150 fused with an edge contact on TL section 180.

TL section 180 may include 2:1 RF couplers 118_1, 118_2 and 118_3 such as Wilkinson or hybrid couplers to form an overall K:1 combiner/divider. In the embodiment illustrated, the transmission line medium of both TL section 180 and RFIC chips 150 is coplanar waveguide (CPW). In the CPW mediums, a pair of ground conductors 181_*g*1 and 181_*g*2 are arranged on opposite sides of signal conductor 181_*s*, and a pair of ground conductors 151_*g*1 and 151_*g*2 are arranged on opposite sides of signal conductor 151_*s*. Each ground conductor 151_*g*1 and 151_*g*2 is interconnected with an adjacent portion of ground conductor 181_*g*1 and 181_*g*2, respectively, through an USIN 141. Alternatively, the transmission line medium in RFIC chips 150 and TL section 180 is microstrip, in which case the ground conductors 151 and 181 are omitted. Herein, an RFIC chip 150 having CPW beamforming circuitry will be referred to as a CPW chip, and an RFIC chip 150 having microstrip beamforming circuitry will be referred to as a microstrip chip. Analogous terminology may be used for TL section 180. In an alternative embodiment to that illustrated in FIG. 1, a microstrip chip 150 may be interconnected with a CPW TL section 180 through a hybrid transition within microstrip chip 150. This embodiment will be described later in connection with FIGS. 5A-6. In any case, one example material of a dielectric substrate 185 of TL section 180 is alumina. In medium or large element arrays, antenna 100 may include a plurality of TL sections 180 to facilitate manufacturing, particularly in the handling of brittle alumina substrates. The plurality of TL sections 180 may be interconnected by wirebonds or the like, if necessary.

With the interconnection structure and layout of antenna 100, the upper portions of RFIC chips 150 are active die sides ("active regions") of the chips, where beamforming circuitry comprising amplifiers and/or phase shifters reside. For instance, doping regions and metallization of beamforming circuitry transistors, as well as combiner/divider 153 conductors are located within the active regions. By using upper surface interconnects 141 between RFICs 150 and transmission line section 180 to interconnect upper surface conductors, an extra transmission line layer within antenna substrate 110 to form the RF connections between RFICs 150 and TL section 180 can be avoided. Thus, the fabrication of antenna substrate 110 may be facilitated by omitting the process steps for forming another transmission line layer. Antenna substrate 110, which may thereby be formed with a single layer of dielectric 190, is referred to herein as a "single RF layer" substrate. Meanwhile, a polymer layer of layer region 220 may form the top surface 111 of antenna substrate 110. In an alternative embodiment to that shown in FIG. 2, RFICs 150 may be flipped such that the active die side faces the antenna substrate. This may result in a higher loss interface due to the proximity of the polymer layer and, in some cases, an underfill surrounding connection joints 157.) When the active die side faces up as shown in FIG. 2, it is spaced relatively far from antenna ground plane 210. This makes the configuration less prone to oscillations due to reflections between ground plane 210 and the active die side.

Each ACU 130 includes an amplifier and/or a phase shifter to adjust a transmit signal and/or a receive signal provided to/from an antenna element 125. With RFIC chips 150 distributed across the effective aperture of antenna 100 and each coupled to one or more antenna elements 125, antenna 100 may be understood as an active antenna array. In embodiments where the ACUs 130 include phase shifters for dynamic phase shifting of the signals, antenna 100 functions as a phased array. In such a phased array embodiment, a beam formed by antenna 10 is steered to a desired beam pointing angle set mainly according to the phase shifts of the phase shifters. Additional amplitude adjustment capability within RFICs 150 may also be included to adjust the antenna pattern. In any case, antenna 100 may be configured as a transmitting antenna system, a receiving antenna system, or both a transmitting and receiving antenna system.

Figure 9:
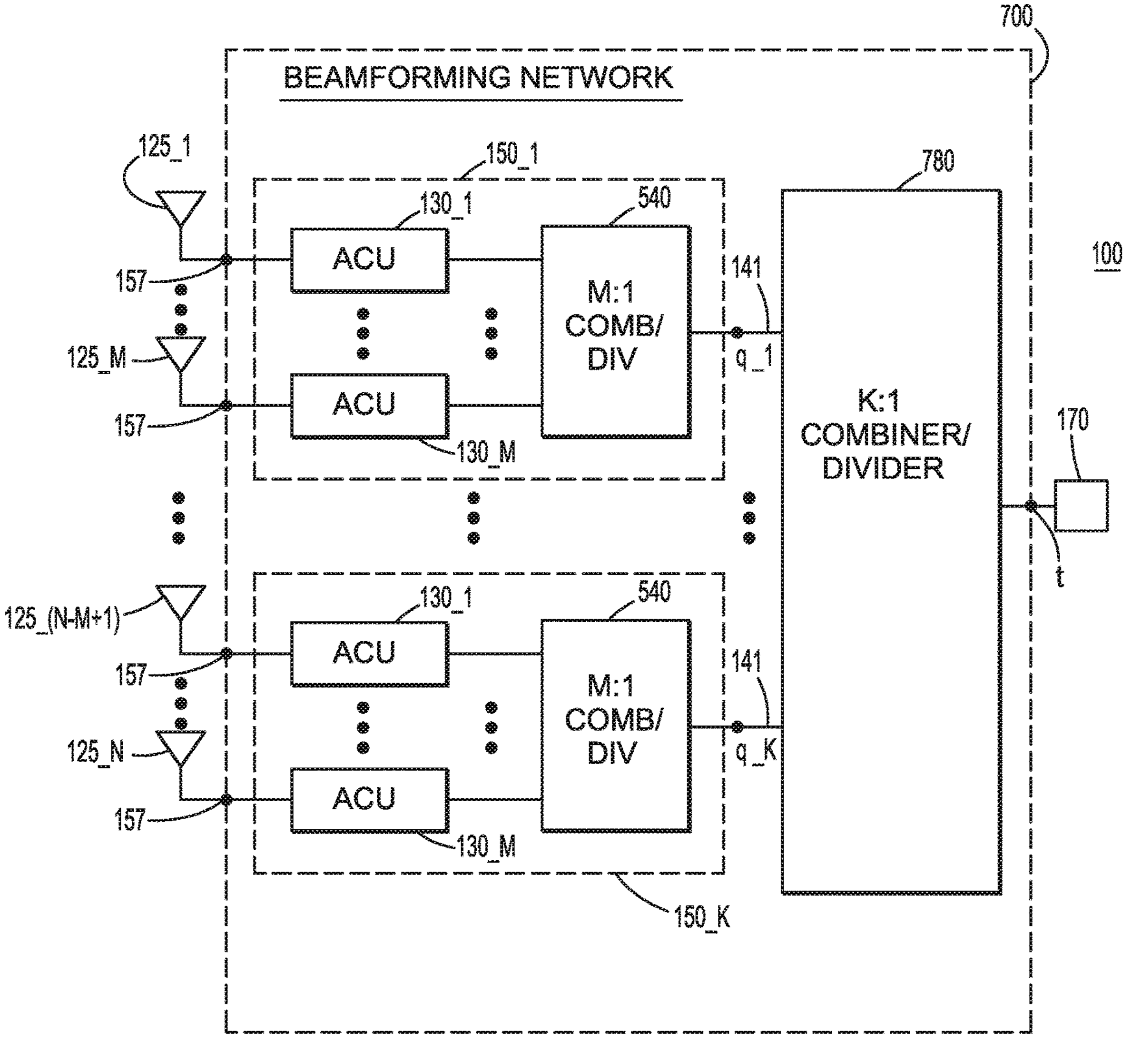
FIG. 9 is a schematic diagram depicting a beamforming network within the antenna apparatus.

A connector 170 may be side mounted or top mounted and connect to signal conductor 181_*s*. In the transmit direction, an input RF transmit signal is applied to connector 170 and divided into K divided transmit signals by couplers 118 and the K divided transmit signals are applied to RFIC chips 150_1 to 150_K, respectively. (A schematic illustration of signal flow is shown in FIG. 9, discussed later.) If an RFIC 150_*j* includes a plurality M of ACUs 130, RFIC 150_*j* may further include an M:1 combiner/divider 153 that splits the divided transmit signal into M further divided signals, each applied to one of the ACUs 130. Once adjusted by the ACUs 130, the adjusted signals are "element signals" each applied to one of antenna elements 125.

A reverse signal flow occurs in the receive direction, in which an element signal is received by an ACU 130 from an antenna element 125, and adjusted by a receive amplifier and/or a phase shifter (and typically filtered). The adjusted receive signal is routed through combiner/dividers 153 and 118 to produce a composite receive signal at connector 170. It is noted here that a beam forming network (BFN) may be considered to encompass all of the signal paths between signal connector 170 and antenna elements 125_1 to 125_N. In the BFN, a single input transmit signal is divided into N element signals, and/or N element signals received from antenna elements 125 are combined into a single composite receive signal.

FIG. 2 also illustrates that antenna 100 may include a cover 107 (not shown in FIG. 1) protecting at least the upper side from external elements. Since USINs 141 may be fragile, they should be protected from dust, moisture, etc.; cover 107 is suitably attached to the remaining assembly to provide such protection. In other examples, a printed wiring assembly (PWA) is attached to the upper side of antenna 100 in place of cover 107 and provides the desired protection from external elements. A radome may also be provided at the lower surface to protect antenna elements 125.

In FIGS. 1 and 2, two antenna elements 125 are shown coupled to each RFIC 150 as an example. In other examples, each RFIC chip 150 is coupled to a single antenna element 125, or to three or more antenna elements 125. Antenna 100 is also shown to include additional chips 160_1 and 160_2, such as serial peripheral interface (SPI) chips. Chips 160 may function to provide DC signals and/or control signals to the RFICs 150 through signal lines such as 304_1, 308_1 formed within layer region 220 of antenna substrate 110. The DC signals may bias amplifiers and/or control switching states of switches within ACUs 130. The control signals may control phase shifts of phase shifters within ACUs 130.

Antenna elements 125 may each be a microstrip patch antenna element printed on antenna substrate 190. Other types of antenna elements such as dipoles or monopoles may be substituted. When embodied as microstrip patches, antenna elements 125 may have any suitable shape such as circular (as exemplified in FIG. 1), square, rectangular or elliptical, and may be fed and configured in a manner sufficient to achieve a desired polarization, e.g., circular, linear, or elliptical. The number of antenna elements 125, their type, sizes, shapes, inter-element spacing, and their feed mechanism may vary from embodiment to embodiment according to performance objectives of the application. While an example of antenna 100 is illustrated with eight antenna elements 125, a typical embodiment for achieving a narrow antenna beam may include hundreds or thousands of antenna elements 125. In embodiments described below, each antenna element 125 is a microstrip patch fed with a single probe feed. The probe feed may be implemented as a via 155 that electrically connects to an RF contact 157 of an RFIC 150, interchangeably called an input/output (I/O) pad. An I/O pad is an interface that allows signals to come into or out of the RFIC 150. In another example, each antenna element 125 is fed by two offset vias 155 using a different circular polarization feeding method. In other examples, an electromagnetic feed mechanism is used instead of a via 155, where each antenna element 125 is excited from a respective feed point with near field energy.

In an example, antenna 100 is configured for operation over a millimeter (mm) wave frequency band, generally defined as a band within the 30 GHz to 300 GHz range. In other cases, antenna 100 operates in a microwave range from about 1 GHz to 30 GHz, or in a sub-microwave range below 1 GHz. Herein, a radio frequency (RF) signal denotes a signal with a frequency anywhere from below 1 GHz up to 300 GHz. Note that an RFIC configured to operate at microwave or millimeter wave frequencies is often referred to as a monolithic microwave integrated circuit (MMIC), and is typically composed of III-V semiconductor materials such as indium phosphate (InP) or gallium arsenide (GaAs), or other materials such as silicon-germanium (SiGe).

Figure 3A:
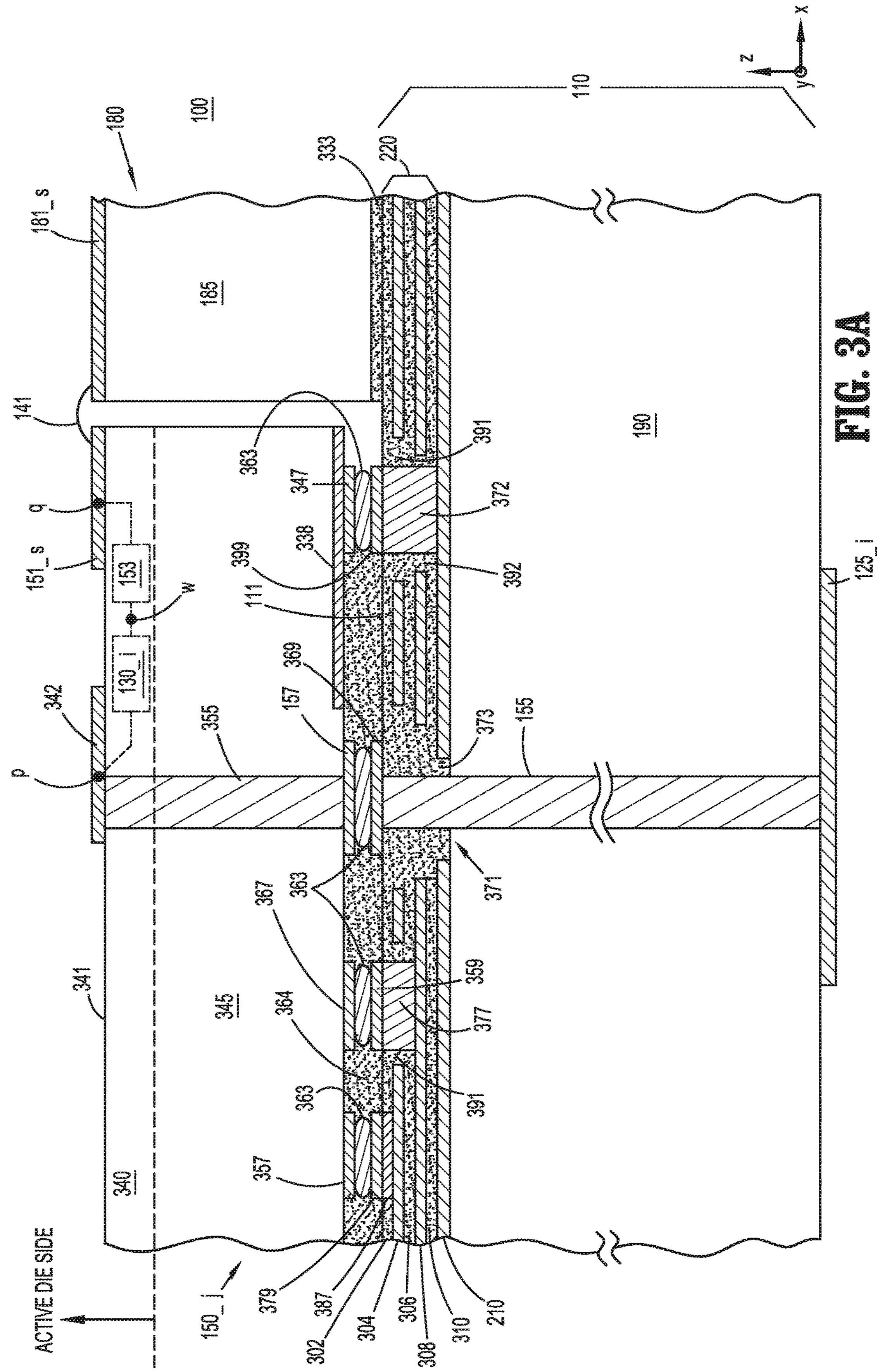
FIG. 3A is a cross-sectional view of a portion of the antenna apparatus taken along the lines 3A-3A of FIG. 1, illustrating an example interconnection structure which is suitable between a CPW RFIC chip and a CPW transmission line section.
Figure 3B:
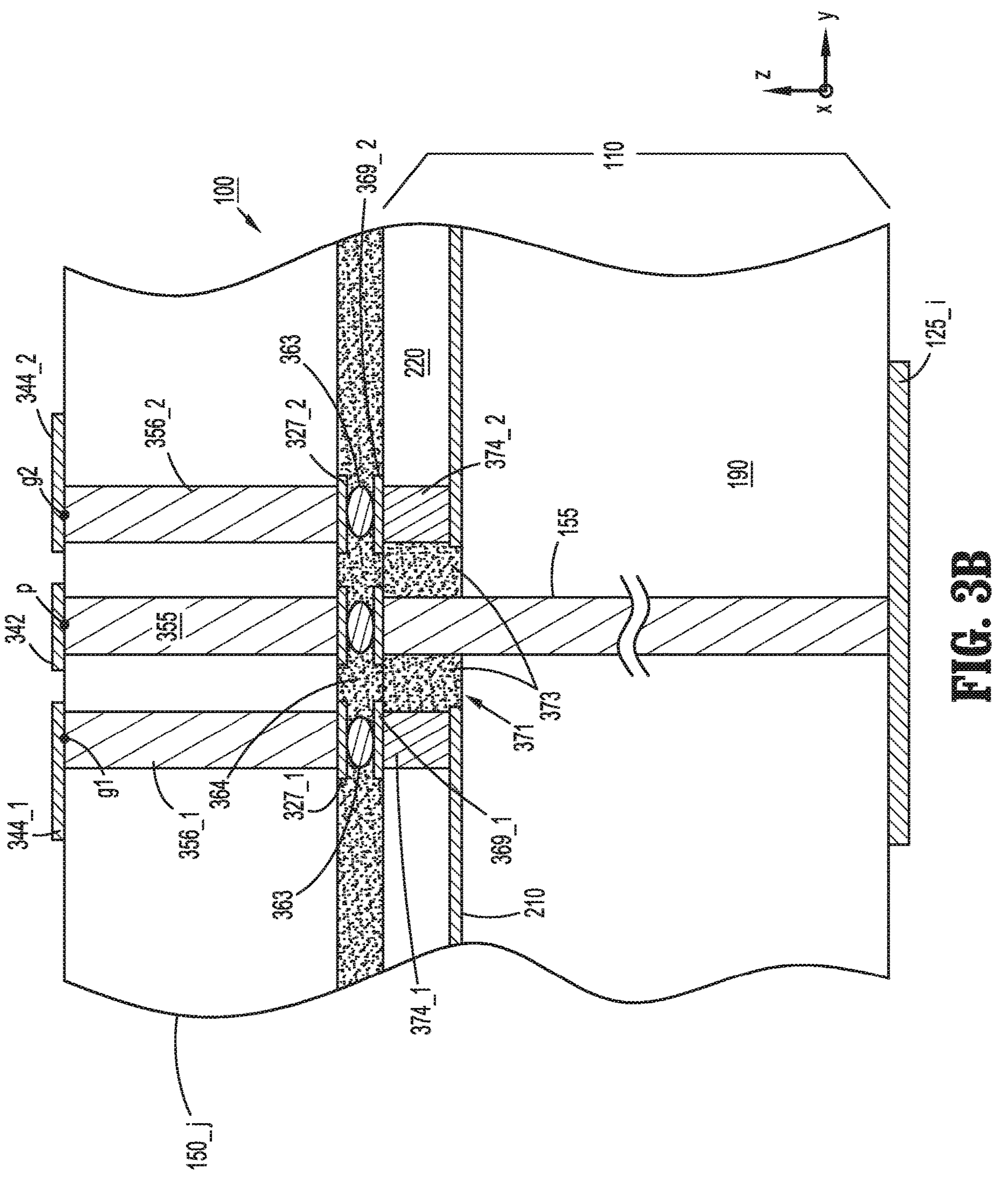
FIG. 3B is a cross-sectional view of an example interconnection structure within the antenna apparatus along a plane orthogonal to that shown in FIG. 3A.

FIG. 3A is a cross-sectional view of a portion of antenna 100 taken along the lines 3A-3A of FIG. 1, and illustrates an example interconnection structure suitable for an embodiment with CPW chips 150 and a CPW transmission line section 180. An antenna element 125_*i* is coupled to beamforming circuitry of an ACU 130_*i* formed within an active die side 340 of RFIC chip 150_*j* (i, j=any integers). Such coupling may be made through a first via 155, a catch pad 369, an electrically conductive joint 363, an RF contact 157, a second via 355, and a conductor 342. (One or more ground vias that form a GS or GSG connection set together with second via 355 may also be included to reduce noise, as shown in FIG. 3B and discussed below.) First via 155 may form at least part of a probe feed for the antenna element 125_*i*. First via 155 is formed within dielectric 190 and electrically connects antenna element 125_*i* to catch pad 369 formed on upper surface 111 of antenna substrate 110. First via 155 passes through opening 371 formed in ground plane 210 to prevent shorting to the ground plane. Opening 371 may be annularly surrounded by an isolation material 373 such as a polymer at the depth level of ground plane 210. Isolation material 373 may be composed of the same material as that within isolation layers of layer region 220.

Layer region 220 may include, in order from upper surface 111 to ground plane 210, a first isolation layer 302, a first conductive layer 304, a second isolation layer 306, a second conductive layer 308, and a third isolation layer 310. First and second conductive layers 304, 308 may be patterned to form signal lines such as 304_1 and 308_1 (see FIG. 1) used to route DC and/or control signals to RFIC chips 150, e.g., from SPI chips 160_1, 160_2. Conductive layers 304 and 308 are composed of metal or other conductive material. Openings may have been formed in conductive layers 304, 308, e.g. by not depositing conductive material in regions of the openings during the respective layer formation. The openings may be annularly surrounded by isolation material, so that first via 155 traverses the openings and does not short to conductive layers 304, 308. Note that each of the layers 302, 304, etc. within layer region 220 may be at least one order of magnitude thinner than dielectric 190. For example, each of these layers may have a thickness (in the z direction) on the order of 2-10 μm, whereas dielectric 190 may be on the order of 250 μm thick. First and second conductive layers 304 and 308 may each form signal/ground lines in the x-y plane having a width on the order of 12 μm and spaced from one another by a spacing on the order of 12 μm. Each of layers 304 and 308 may have been etched or otherwise patterned to form tens, hundreds or thousands of signal lines and ground lines in a typical embodiment of antenna 100. Nevertheless, in other embodiments, layer region 220 may be omitted, in which case bias voltages and signals are routed to RFICs 150 via other means.

Contact pad 369 is electrically connected to RF contact 157 through a conductive joint 363 such as a solder ball, gold bump, copper pillar with a solder cap, thermocompression bond or conductive epoxy. RF contact 157 is in turn connected to conductor 342 through the second via 355 which is formed within RFIC chip 150_*j* through the chip material 345, e.g., InP or GaAs. Conductor 342 may directly connect to, or form part of, metallization of a transistor terminal or other circuit element of the beamforming circuitry. Conductor 342 may be printed metallization atop upper surface 341 of RFIC chip 150_*j*, in which case second via 355 may be formed as a through substrate via (TSV) that extends completely through the chip material 345. Alternatively, conductor 342 is located below top surface 341 and second via 355 is formed as a blind via that connects on its upper end to conductor 342 within chip material 345. Conductor 342 corresponds to a circuit point p of the beamforming circuitry, where circuit point p may be an input node of ACU 130. The output of ACU 130, corresponding to a circuit point w, may connect to a branch arm port (output port) of combiner/divider 153 (if present).

An input port of combiner/divider 153 electrically connects to conductor 151_*s* at a circuit point "q". USIN 141 connects conductor 151_*s* to conductor 181_*s* of TL section 180. If USIN 141 is a wire bond, it may have a cylindrical or circular cross-section. If USIN 141 is a ribbon bond, it may have an elliptical or rectangular cross-section. Conductor 181_*s* may be printed metallization on the upper surface of dielectric 185 of TL section 180. If TL section 180 is coplanar waveguide, the lower surface of dielectric 185 may be adhered to the top surface 111 of antenna substrate 110 (the upper surface of polymer layer 302) using a nonconductive or conductive epoxy 333.

In a typical embodiment, RFIC chip 150_*j* may have tens or over one hundred electrical contacts such as 357, 367 at its lower surface. These contacts may receive bias voltages and/or control signals from signal lines formed in first and second conductive layers 304 and 308, through interconnects with conductive joints 363. For instance, to connect a signal line formed in first conductive layer 304 to an electrical contact 357 of RFIC chip 150_*j*, an opening may have been made in first isolation layer 302 to expose the signal line of the first conductive layer 304, and a conductive well 387 may have been formed in the opening. The opening in first isolation layer 302 may have been made by placing resist material on layer 304 in the location of the subsequent opening and then depositing the isolation material of isolation layer 302 in regions that exclude the resist material. A contact pad 379 may have been formed on the well 387, and a conductive joint 363 formed by a heating/cooling process may connect contact pad 379 with contact 357. Alternatively, contact pad 379 is omitted and conductive joint 363 conductively adheres to well 387.

In a similar fashion, to connect a signal line formed in second conductive layer 308 to an electrical contact 367 of RFIC chip 150_*j*, an opening may have been formed in each of first isolation layer 302, first conductive layer 304 and second isolation layer 306. The process of forming the openings may have likewise involved placing resist material in the locations of the subsequent openings, one layer at a time, while the corresponding layer material is deposited. Additional isolation material 391 e.g., the same material as that of isolation layers 302, 306) may have been deposited in an annular region around the opening in first conductive layer 304. This material prevents shorting to a subsequent conductive well 377 formed by deposition or the like within a cavity produced by the series of openings. A contact pad 359 may have been formed on conductive well 377. A conductive joint 363 connects electrical contact 367 to contact pad 359, or electrical contact 367 directly to conductive well 377 if contact pad 359 is omitted.

In some cases it is desirable to form a direct electrical connection between an electrical contact of RFIC 150 and antenna ground plane 210. For instance, electrical contact 347 is electrically connected to ground plane 210 through a connection joint 363, a contact pad 399 and a conductive well 372 (connection joint 363 may directly interface with conductive well 372 if contact pad 399 is omitted). A ground surface 338 may be present at the lower surface of RFIC chip 150 and may conductively adhere to contact 347. Ground surface 338 may be a DC ground and/or a transmission line ground (e.g. a microstrip, CPW or stripline ground conductor). Note that in some cases there may be different types of transmission line mediums present in a single RFIC chip 150. Conductive well 372 may have been formed in a similar manner as conductive well 377, with a process that forms additional openings through second conductive layer 308 and third isolation layer 310 to expose a surface of ground plane 210. Additional isolation material 392 may have been deposited in an annular region surrounding the opening in second conductive layer 308 to prevent shorting to conductive well 372 which is subsequently formed.

An underfill material 364 may surround at least some of the connection joints 363 to provide mechanical support to the connection joints and thereby improve their reliability. Typically, underfill material 364 may be a mixed material composed primarily of amorphous fused silica.

FIG. 3B is a cross-sectional view of an example interconnection structure within antenna 100 along a plane orthogonal to the plane shown in FIG. 3A. The view of FIG. 3B (a y-z plane view) intersects first via 155 and second via 355 (both depicted in the x-z plane in FIG. 3A) and illustrates a ground-signal-ground (GSG) transition from ground plane 210 to coplanar waveguide at the upper surface of RFIC chip 150_*j*. The GSG transition may prevent radiation from second via 355 from impacting the beamforming circuitry performance.

The coplanar waveguide at the upper surface of RFIC chip 150_*j* includes signal conductor 342 and first and second ground conductors 344_1, 344_2 on opposite sides thereof. A first ground via 356_1 has an upper end connected to first ground conductor 344_1 to define a first ground point g1 (discussed in schematics below). First ground via 356_1 may connect at its lower end to a catch pad 327_1 at the lower surface of RFIC chip 150_*j*. An interconnect between catch pad 327_1 and a connection point of ground plane 210 at one side of first via 155 may include a conductive joint 363, a catch pad 369_1 and a conductive well 374_1. Likewise, a second ground via 356_2 has an upper end connected to second ground conductor 344_2 to define a second ground point g2. Second ground via 356_2 may connect at its lower end to a catch pad 327_2. An interconnect between catch pad 327_2 and a connection point of ground plane 210 at the opposite side of first via 155 may include a conductive joint 363, a catch pad 369_2 and a conductive well 374_2.

Isolation material 373 annularly surrounds a region between first via 155 and first and second conductive wells 374_1, 374_2 to prevent first via 155 from shorting to ground. With this configuration, a probe feed may be understood to be launched from the level (in the z direction) of the ground plane 210, such that unwanted radiation between ground plane 210 and the upper surface of RFIC chip 150_*j* is minimized. It is noted here that alternative configurations may employ only a single ground via 356 to form a ground-signal (GS) transition; or, three or more ground vias 356 surrounding second via 355 (which may still be considered a GSG transition). Yet another alternative employs a slotline transition as a substitute for second via 355 and the first and second ground vias 356_1, 356_2.

Figure 4A:
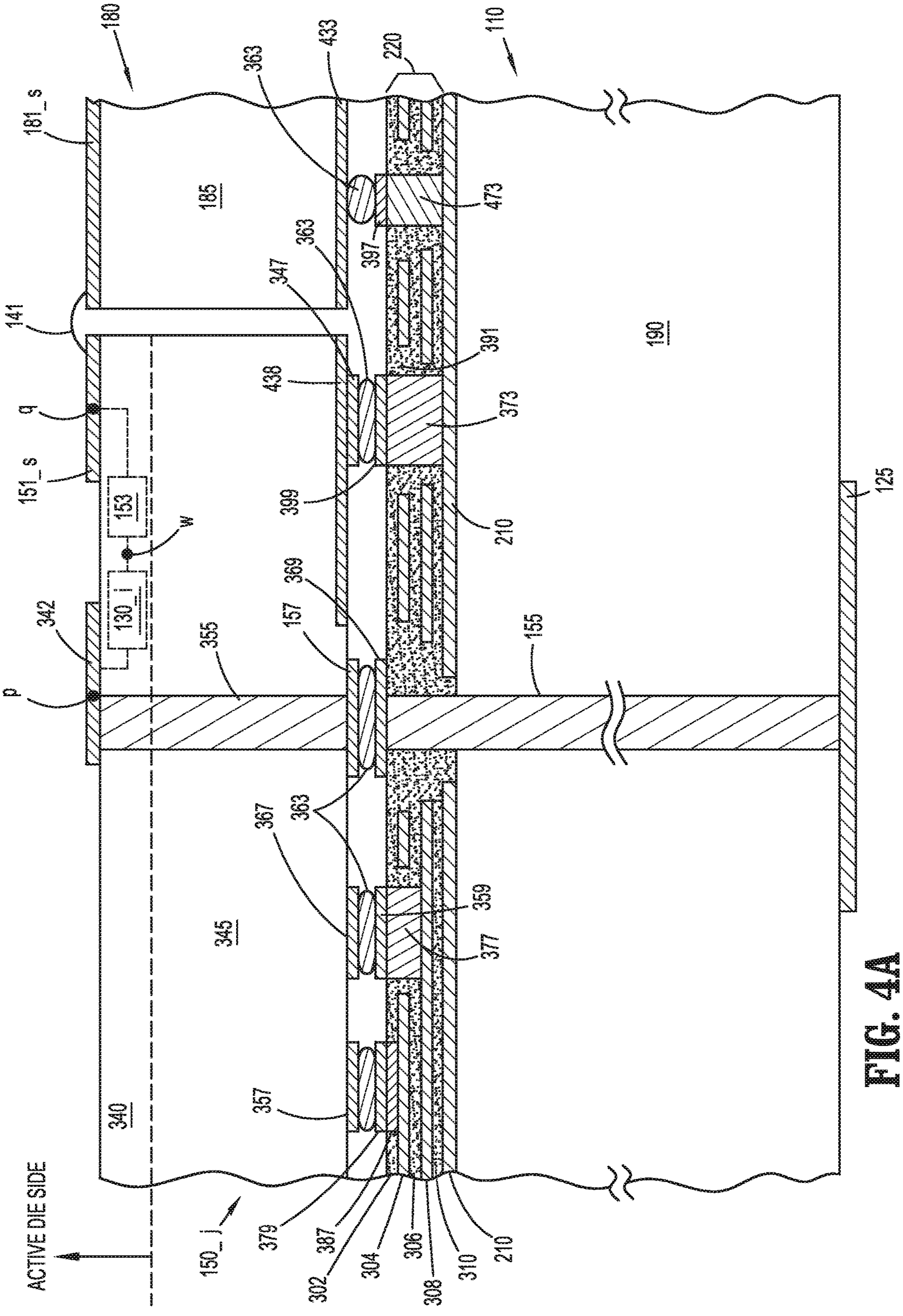
FIG. 4A is a cross-sectional view of a portion of the antenna apparatus along the lines 3A-3A of FIG. 1 in an embodiment employing a microstrip chip and a microstrip transmission line section.

FIG. 4A is a cross-sectional view of a portion of antenna 100 along the lines 3A-3A of FIG. 1 in an embodiment employing a microstrip chip and a microstrip transmission line section. In this example, it is assumed that ground conductors 151_*g*1, 151_*g*2, 181_*g*1 and 181_2 are omitted and each of signal conductors 151_*s* and 181_*s* is a microstrip signal conductor. A microstrip ground plane 438 may be present at the lower surface of RFIC chip 150_*j*. Microstrip ground plane 438 may be a ground plane for a microstrip medium with signal conductors such as 151_*s* and other signal conductors of beamforming circuitry of ACU 130 and combiner/divider 153 within active region 340. Microstrip ground plane 438 may electrically connect to antenna ground plane 210 through contact pad 347, a conductive joint 363, contact pad 399 and conductive well 373, discussed above. Transmission line section 180 of FIG. 4A includes microstrip inner conductor 181_*s* at the upper surface and a ground plane 433 at the lower surface. Ground plane 433 may likewise connect to antenna ground plane 210 through a conductive joint 363, a contact pad 397 and a conductive well 473 similar to conductive well 373.

Figure 4B:
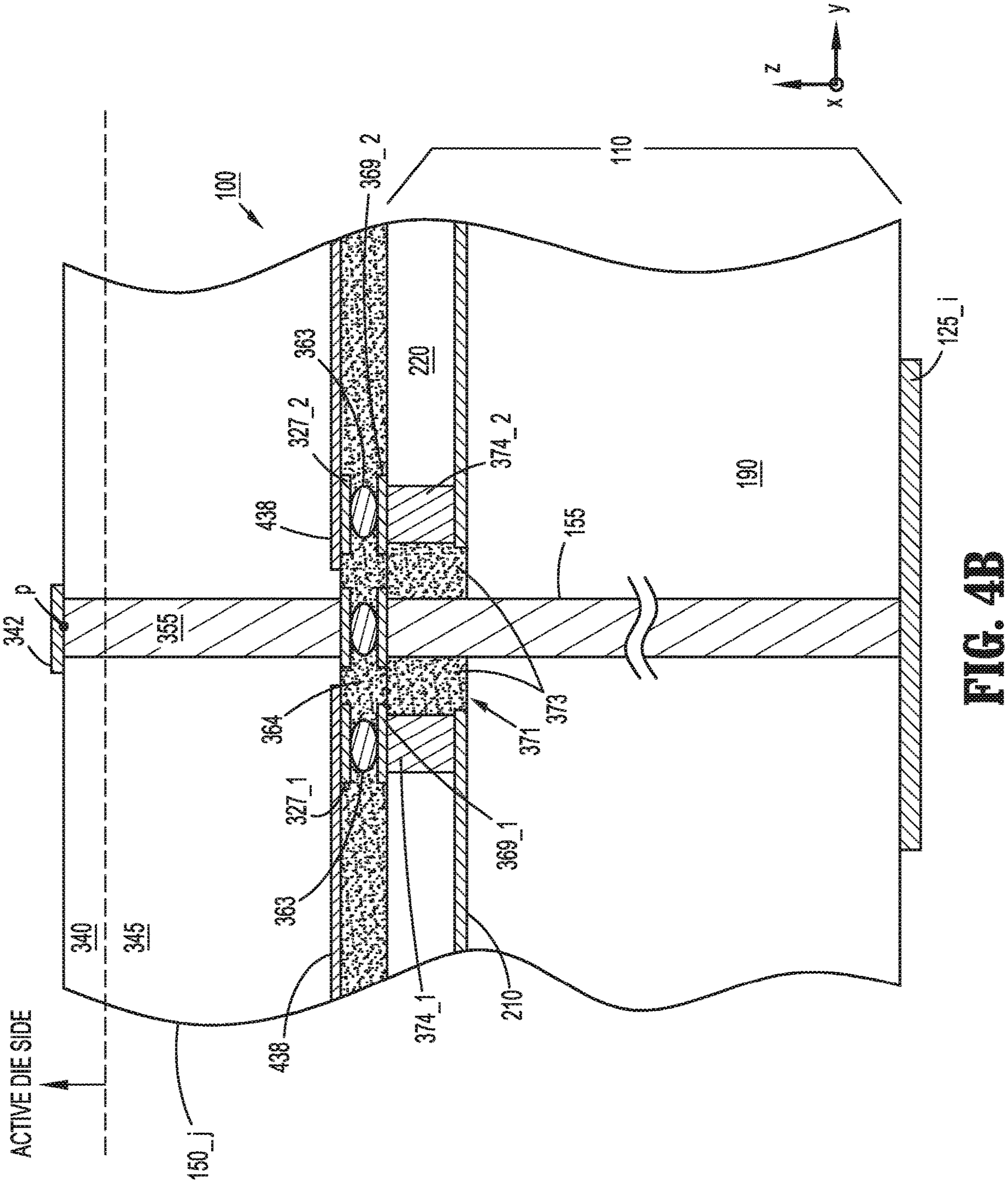
FIG. 4B is a cross-sectional view of an example interconnection structure within the antenna apparatus of FIG. 4A along a plane orthogonal to that shown in FIG. 4A.

FIG. 4B is a cross-sectional view of an example interconnection structure within antenna 100, configured with microstrip as in FIG. 4A, along a plane orthogonal to the plane shown in FIG. 4A. The view of FIG. 4B intersects first via 155 and second via 355 and illustrates a GSG transition from ground plane 210 to a microstrip medium formed by: microstrip ground plane 438; signal conductors such as 342 of beamforming circuitry within the active die side 340; and the chip material 345 separating the signal conductors and the microstrip ground plane 438. An interconnect between microstrip ground plane 438 and a connection point of ground plane 210 at one side of first via 155 may include catch pad 327_1, a conductive joint 363, catch pad 369_1 and conductive well 374_1. An interconnect of the same construction to connect the two ground planes 438, 210 may be made on the opposite side of first via 155 with catch pad 327_2, another connection joint 363, catch pad 369_2 and conductive well 374_2. Similar to the CPW case of FIG. 3B, the GSG transition of FIG. 4B may prevent radiation from second via 355 from affecting beamforming circuitry performance. Other aspects and operations of the antenna structure of FIGS. 4A and 4B may be the same as that discussed above for FIGS. 1-3B.

Figure 5A:
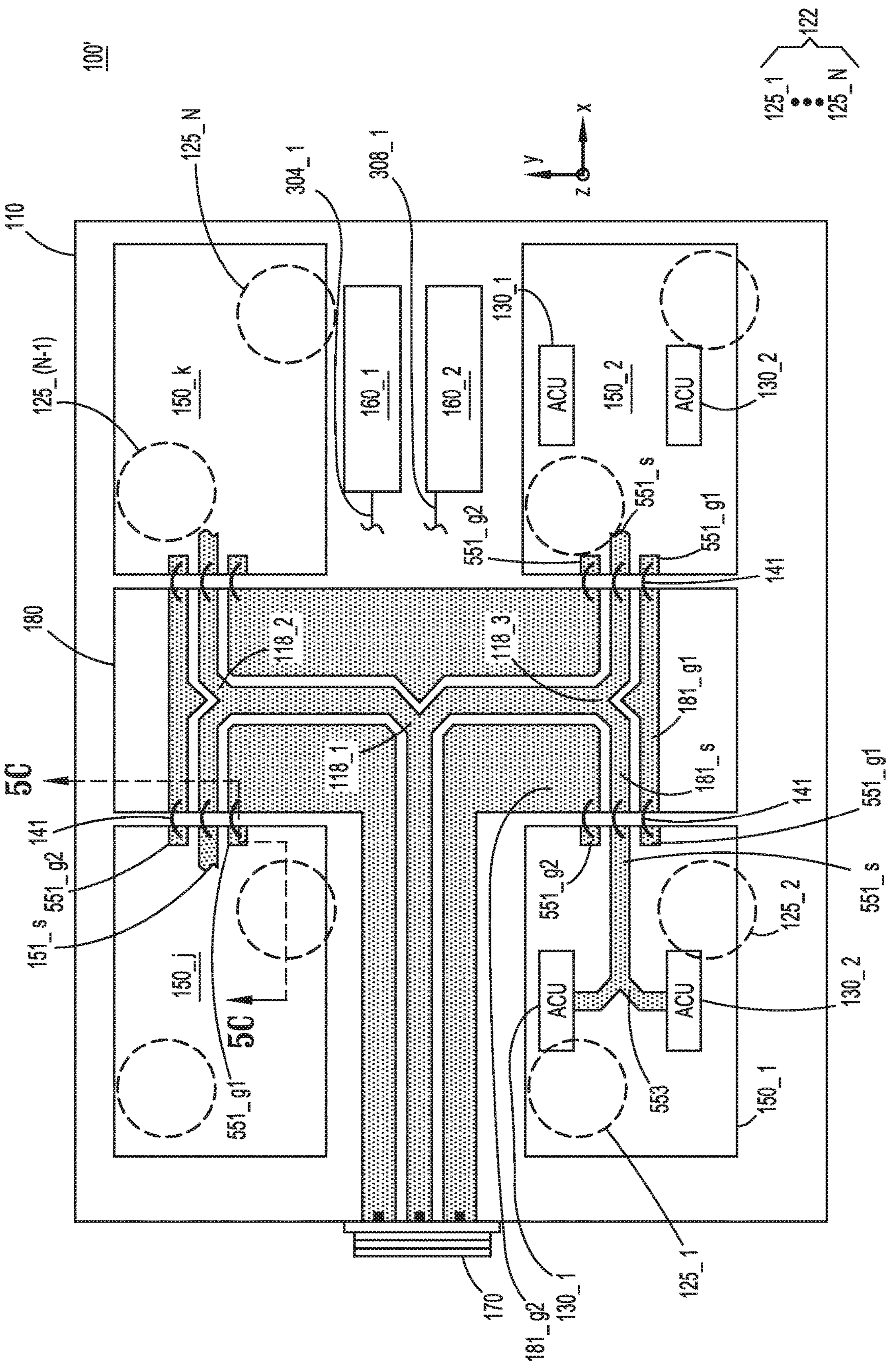
FIG. 5A is a top plan view of an alternative embodiment of the antenna apparatus, employing microstrip RFIC chips and a CPW transmission line section.
Figure 5B:
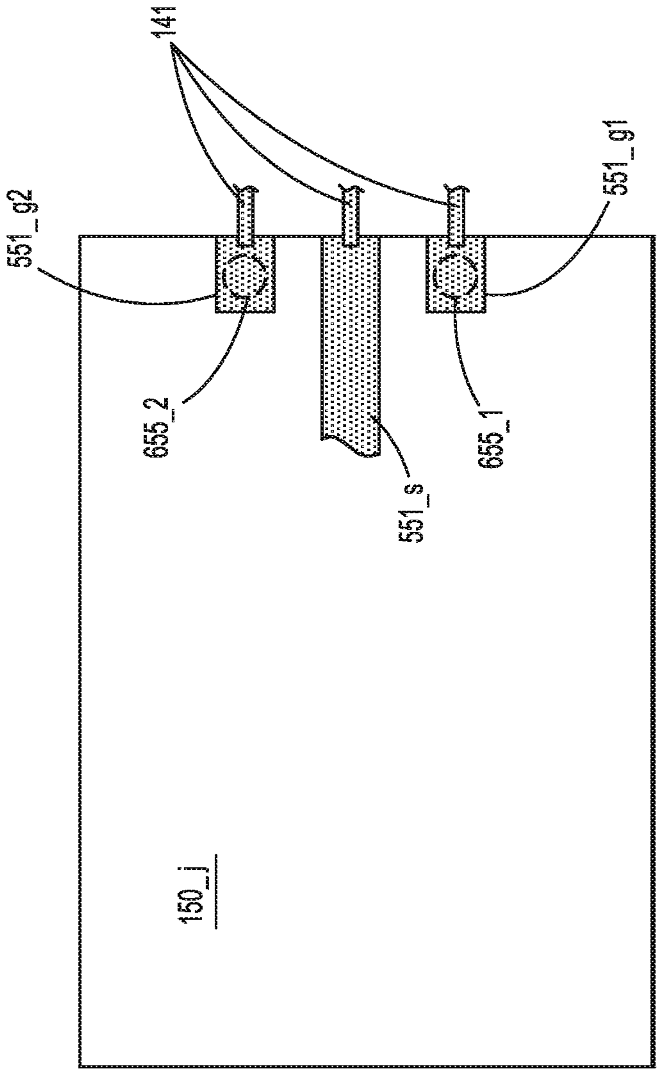
FIG. 5B is a top plan view depicting a portion of an RFIC chip of the antenna apparatus of FIG. 5A.
Figure 5C:
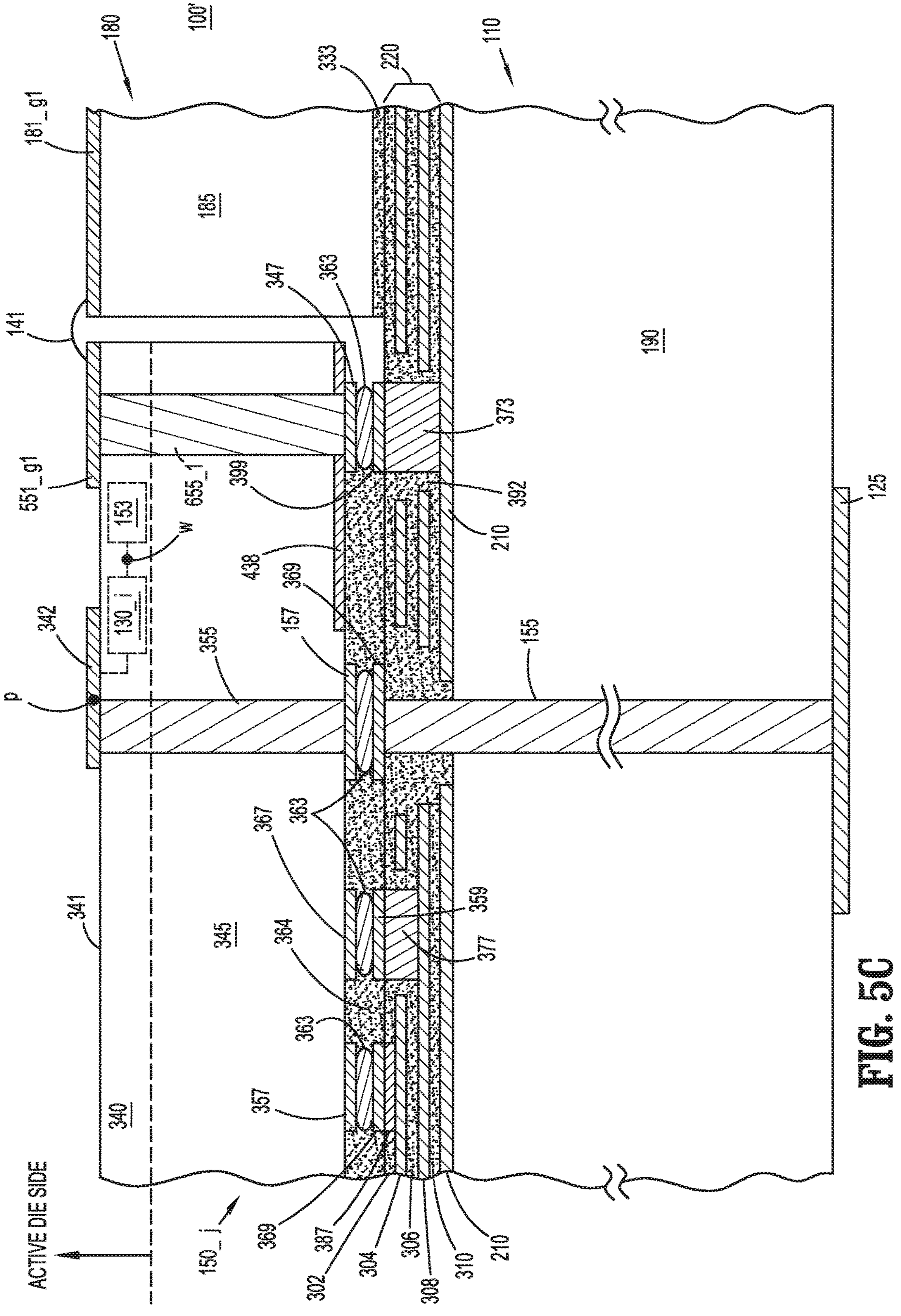
FIG. 5C is a cross-sectional view of an example interconnection structure taken along the lines 5C-5C of FIG. 5A.

FIG. 5A is a top plan view of an antenna apparatus, 100', according to alternative embodiment. FIG. 5B is a top plan view depicting a portion of an RFIC chip of antenna apparatus 100', and FIG. 6 is a cross-sectional view of an example interconnection structure taken along the lines 6-6 of FIG. 5A. Referring collectively to FIGS. 5A, 5B and 6, antenna 100' differs from antenna 100 illustrated in FIG. 1 above by configuring RFIC chips 150_1 to 150_K as microstrip chips rather than CPW chips. Microstrip RFIC chips 150 may include a microstrip combiner/divider 553, microstrip ACUs 130, and a microstrip to CPW transition, hereafter called a "hybrid transition". Combiner/divider 553 may include a microstrip signal conductor 551_*s* at its input port, and output branches connected to respective ACUs 130. The hybrid transition may be formed by: an input portion of signal conductor 551_*s* at the edge of RFIC chip 150; first and second ground pads 551_*g*1 and 551_*g*2 on opposite sides of signal conductor 551_*s*; and first and second ground vias 655_1 and 655_2.

First and second ground vias 655_1 and 655_2 respectively connect ground pads 551_*g*1 and 551_*g*2 to microstrip ground surface 438. FIG. 6, which shows a cross-sectional view partly through first ground pad 551_*g*1 of RFIC chip 150_*j* (with distal structures omitted for clarity), illustrates ground via 655_1 electrically connecting first ground pad 551_*g*1 to microstrip ground surface 438. Second ground via 655_2 may have the same or similar structure. Additionally, the same or similar interconnect as described above between ground surface 438 and antenna ground plane 210 may be formed. This interconnect may include contact/catch pads 347 and 399, conductive joint 363 therebetween, and conductive well 373. Upper surface interconnects 141 may be respectively provided to connect: signal conductor 551_*s* to signal conductor 181_*s*; first ground pad 551_*g*1 to ground conductor 181_*g*1; and second ground pad 551_*g*2 to second ground conductor 181_*g*2. Other aspects of antenna 100' may be the same as that described above for antenna 100.

Figure 6A:
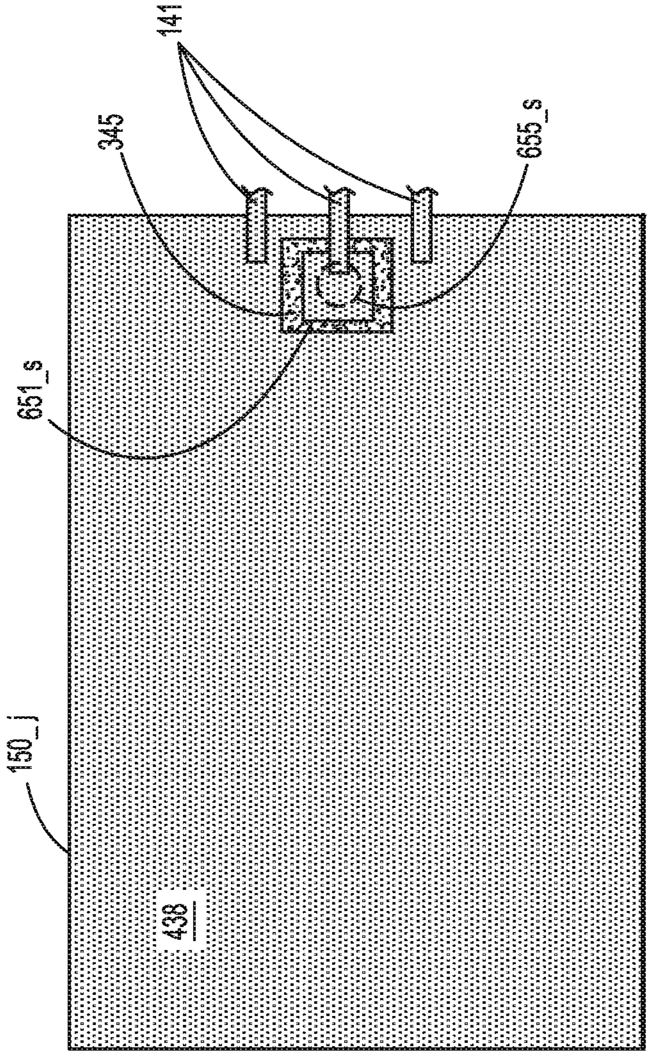
FIG. 6A is a top plan view depicting a portion of a microstrip RFIC chip of an alternative embodiment of the antenna apparatus, in which active die sides of the RFIC chips face the antenna substrate.

FIG. 6A is a top plan view depicting a portion of a microstrip RFIC chip 150_*j* of an alternative embodiment of antenna 100, in which active die sides of the RFIC chips 150 face the antenna substrate 110. In other words, RFICs 150 are flipped as compared to the embodiments discussed above, such that the outer surfaces of the active die sides 340 are considered the lower surfaces of RFICs 150. In this case, upper surface interconnects (USINs) 141 are still utilized to interconnect the beamforming circuitry within the active die sides (albeit through vias within RFICs 150), to the upper surface conductors of TL sections 180. A microstrip ground plane 438 may be present at the upper surface of RFIC chip 150_*j*, and a signal conductor 651_*s* may be in the form of an "island" isolated from ground plane 438 within an annular opening in ground plane 438 exposing chip material 345. A via 655_*s* may be formed between active region 340 at the lower surface and signal conductor 651_*s* on the upper surface. USINs 141 may be wirebonds or ribbon bonds, and if TL section 180 is CPW, a first USIN 141 connects conductor 651_*s* to conductor 181_*s*, and second and third USINs 141 connect points of ground plane 438 on opposite sides of conductor 651_*s* to respective ground conductors 181_*g*1 and 181_*g*2. If TL section 180 is microstrip, the second and third USINs 141 connected to ground plane 438 may be omitted.

Figure 6B:
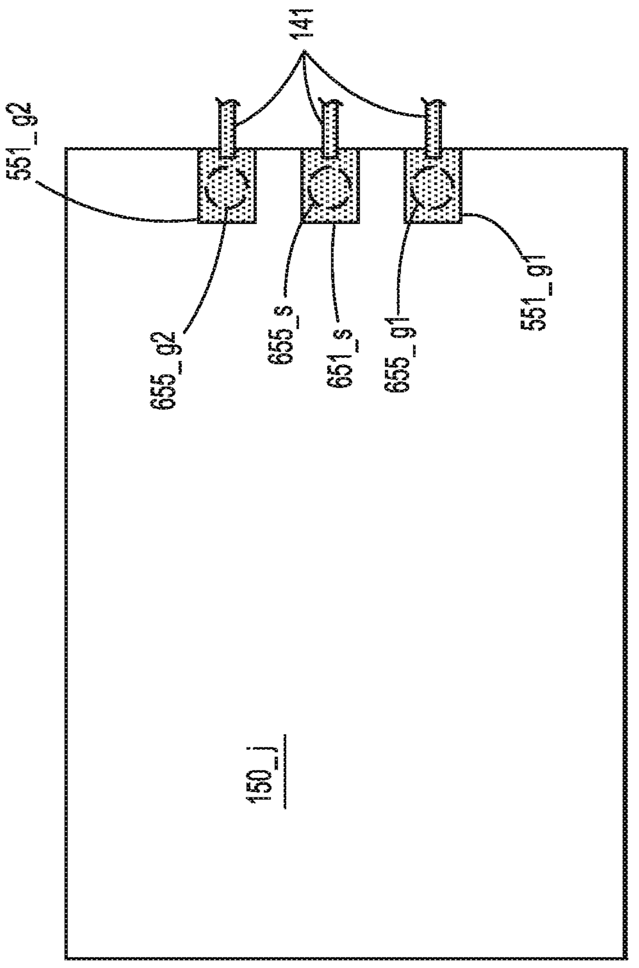
FIG. 6B is a top plan view depicting a portion of a CPW chip of an alternative embodiment of the antenna apparatus, in which active die sides of the RFIC chips face the antenna substrate.

FIG. 6B is a top plan view depicting a portion of a CPW RFIC chip 150_*j* of an alternative embodiment of antenna 100, in which active die sides of the RFIC chips 150 face the antenna substrate 110. As in the embodiment of FIG. 6A, RFICs 150 are flipped as compared to the earlier described embodiments, such that the outer surfaces of the active die sides 340 are considered the lower surfaces of RFICs 150. The upper surface of RFIC chip 150_j may resemble that shown in FIG. 5B, with ground pads 551_g1 and 551_g2 but with a signal conductor 651_s in the form of a pad. In this case, a first via 655_s may be provided to connect the CPW signal conductor within active region 340 to signal conductor 651_s; and second and third vias 655_g1 and 655_g2 are provided to connect first and second ground conductors within the active region 340 to ground pads 551_g1 and 551_g2, respectively. First, second and third USINs 141 may be provided for the connection to TL section 180 in the same manner as discussed for FIG. 5B, if TL section 180 is CPW. If TL section 180 is microstrip, ground pads 551_g1, 551_g2 and vias 655_g1, 655_g2 may be omitted.

Figure 7A:
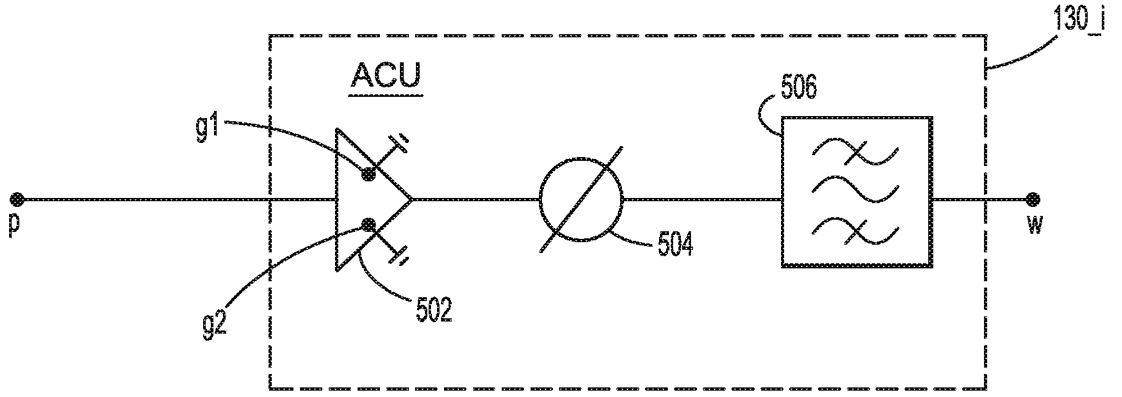
FIGS. 7A, 7B and 7C are schematic diagrams of respective active circuit units (ACUs) within the example antenna apparatus.

FIG. 7A shows example beamforming circuitry of an active circuit unit (ACU) 130_i configured for a receive path (antenna receiving direction) of an RFIC chip 150. ACU 130_i may include front end receiving circuitry between the input point p (as shown in FIGS. 3A-6) and the output point w, which may include a low noise amplifier (LNA) 502, a receive path phase shifter 504 and a bandpass filter 506 connected in series. In the CPW chip case of FIGS. 3A-B, first and second ground points g1 and g2 may be coplanar waveguide ground points of LNA 502, and circuit point p may be an input point of a signal conductor of LNA 502. Phase shifter 504 and filter 506 may also be designed as CPW components. In an embodiment with microstrip chips, microstrip ground plane 438 (seen in FIGS. 4A and 6) may be a ground plane for all components of ACU 130_i. LNA 502 and phase shifter 504 may receive bias/control voltages from vias/signal lines (not shown) within RFIC chip 150 extending from electrical contacts such as 357, 367 (seen in FIGS. 3A, 4A and 6).

Figure 7B:
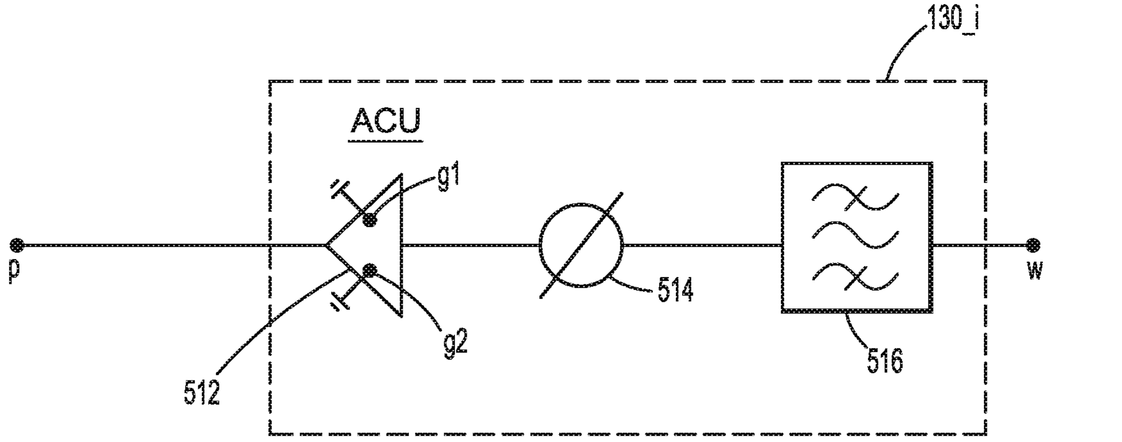

FIG. 7B depicts example beamforming circuitry of an active circuit unit (ACU) 130_i configured for a transmit path (antenna transmitting direction) of an RFIC chip 150. Here, front end circuitry within ACU 130_i may include a power amplifier (PA) 512, a transmit path phase shifter 514 and a bandpass filter 516 connected in series. In the CPW chip case of FIGS. 3A-B, first and second ground points g1 and g2 may be coplanar ground points of PA 512, and circuit point p may be an output point of a signal conductor of PA 512. Phase shifter 514 and filter 516 may also be designed as CPW components. In a microstrip chip embodiment, microstrip ground plane 438 may be a ground plane for all components of ACU 130_i. PA 512 and phase shifter 514 may receive bias/control voltages from vias/signal lines (not shown) within RFIC chip 150 extending from electrical contacts such as 357, 367.

Figure 7C:
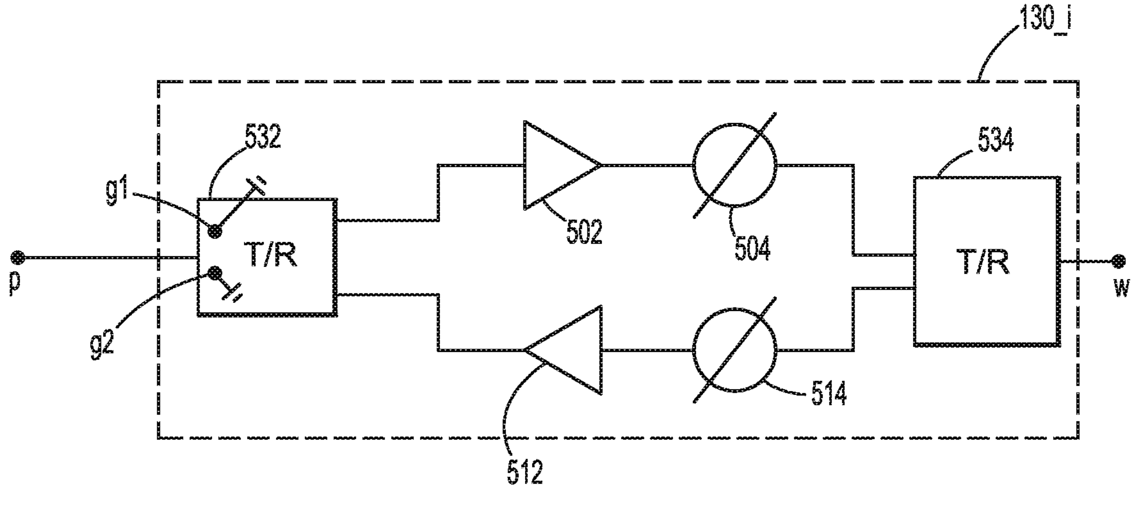

FIG. 7C shows example beamforming circuitry of an active circuit unit (ACU) 130_i configured for both a receive path and a transmit path of an RFIC chip 150. In this case, (ACU) 130_i includes first transmit/receive (T/R) circuitry 532 having an input port connected to input point p, and second T/R circuitry 534 with an input port connected to output point w. A receive path including LNA 502 and phase shifter 504 may be connected between first output ports of T/R circuitry 532, 534. A transmit path including phase shifter 514 and PA 512 may be connected between second output ports of T/R circuit circuitry 532, 534. T/R circuitry 532, 534 may each include bandpass filters and/or switches to allow both transmit and receive path signals to pass from the input port to a respective output port. In some examples, different frequency bands are used for transmit vs. receive signals and bandpass filtering is sufficient to provide isolation between the paths. Time division multiplexed based switching may provide further or alternative isolation between the paths. In a CPW embodiment, first and second ground points g1 and g2 may be ground points of T/R circuitry 532.

Figure 8:
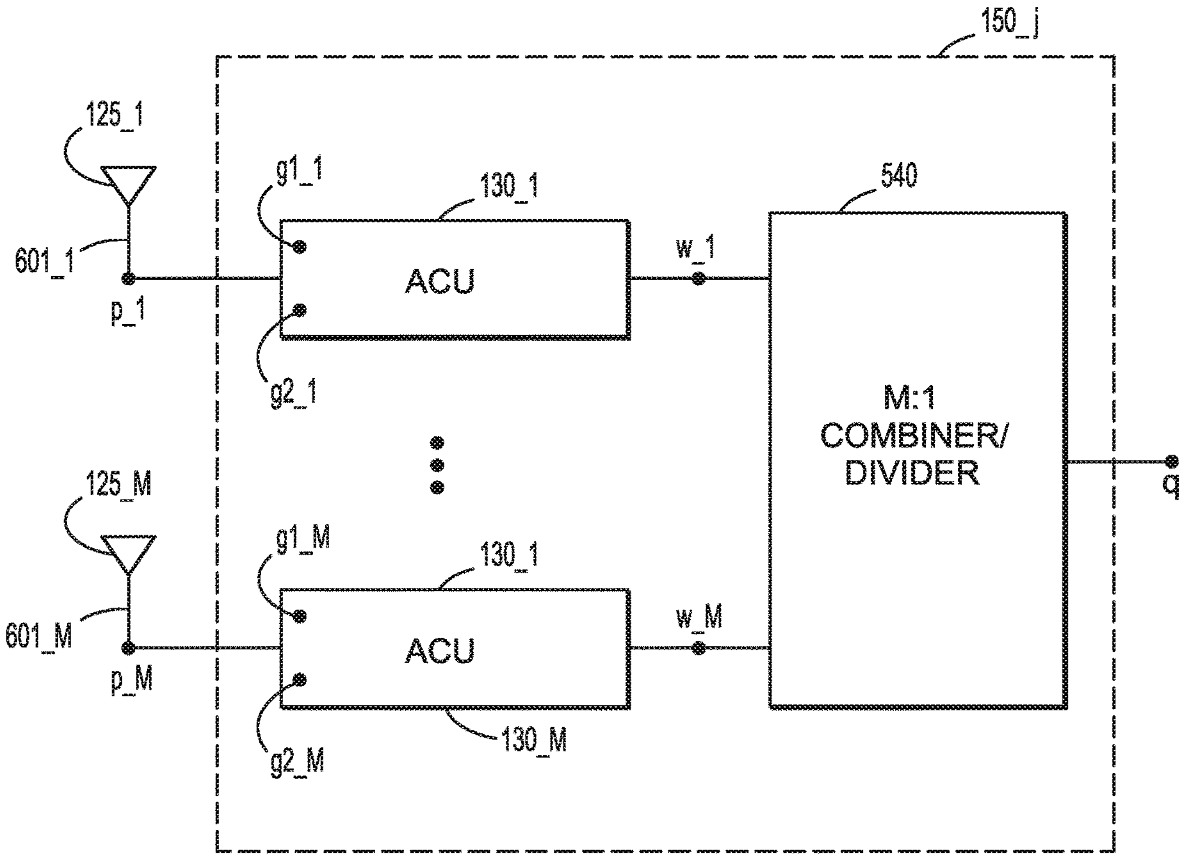
FIG. 8 schematically illustrates example beamforming circuitry comprising multiple ACUs within an RFIC chip.

FIG. 8 schematically illustrates example beamforming circuitry comprising multiple ACUs within an RFIC chip. An RFIC 150_j may include a plurality of ACUs 130_1 to 130_M with respective input ports at circuit points p_1 to _M, respectively, and output ports at circuit points w_1 to w_M, respectively. The integer M can vary from embodiment to embodiment from as low as two (as in the example shown in FIG. 1) to any suitable number of ACUs 130 that may be packaged within a single RFIC chip 150_j. Circuit points p_1 to P_M may be coupled to antenna elements 125_1 to 125_M through feeds 601_1 to 601_M, where each feed 601 includes a second via 355, a first via 155 and interconnect structures therebetween as described above for FIGS. 3A-6 in relation to circuit point p. For instance, in a CPW chip embodiment, each ACU 130_i may have first and second ground conductors tied to first and second ground points g1_i and g2_i. An M:1 combiner 540 combines receive signal outputs from the ADCs 130 at points w_1 to w_M into a combined receive signal at point q in a receive path operation, and/or divides a transmit signal applied at point q into M divided transmit signals applied at points w_1 to w_M to ACUs 130_1 to 130_M.

FIG. 9 is a schematic diagram depicting an example beamforming network (BFN) 700 within antenna 100. BFN 700 may include a K:1 combiner/divider 780 formed within transmission line section 180, and K RFIC chips 150_1 to 150_K, each having the configuration of RFIC 150_j of FIG. 8. K:1 combiner/divider 780 has an input port at a circuit point t connected to connector 170, and K output ports at circuit points q_1 to q_K connected to RFIC chips 150_1 to 150_K. Each RFIC chip 150 may be coupled to M antenna elements such as 125_1 to 125_M through M respective RF contacts 157. Thus, there may be N antenna elements 125_1 to 125_N, where N=M×K. As noted earlier, the number N may number in the hundreds or thousands for a typical antenna 100 that forms a narrow antenna beam. In the example illustrated in FIGS. 1, K=4, M=2 and N=8.

Figure 10:
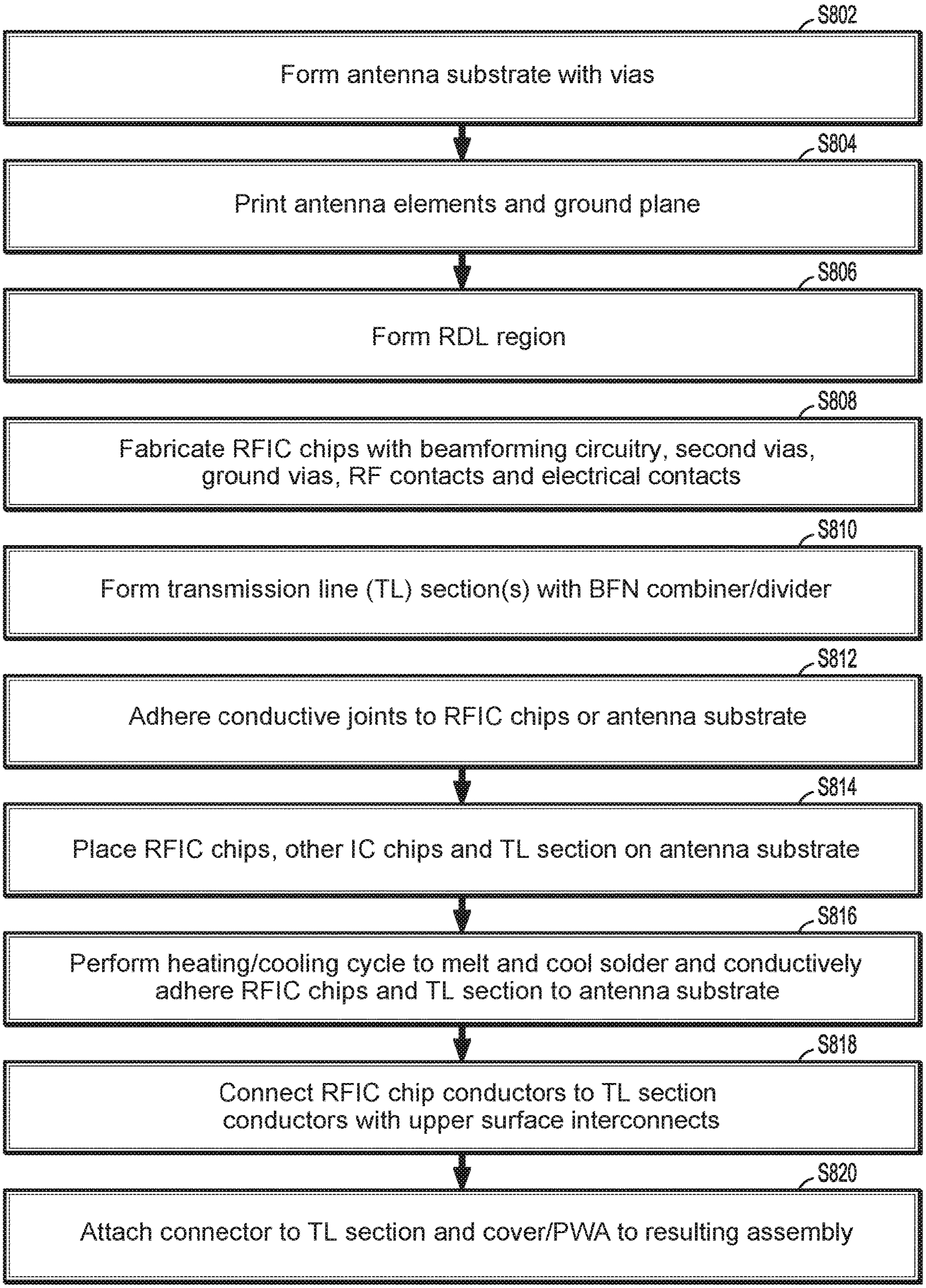
FIG. 10 is a flow chart of an example method of fabricating the antenna apparatus.

FIG. 10 is a flow chart of an example method, 800, of fabricating antenna 100. The order of the shown operations may be modified as desired. In method 800, an antenna substrate 110 may be formed from a wafer and first vias 155 may be formed therein by drilling holes and filling them with conductive material in an electroplating or like process (S802). Antenna elements 125 and ground plane 210 may then be respectively printed on the lower and upper surfaces of the antenna substrate (S804). An RDL region 220 may thereafter be formed on the antenna substrate 110 above the ground plane (S806).

RFIC chips 150 are separately fabricated with beamforming circuitry 130, 153; second vias 355; ground vias 356 (in the case of a CPW embodiment); RF contacts 157; and other electrical contacts such as 357, 367 (S808). Transmission line (TL) section(s) 180 may be separately formed with a BFN combiner/divider 780 (S810). Conductive joints 363 may be initially adhered to RF contacts 157 and other electrical contacts of RFIC chips 150 and/or to catch pads 369/other contacts at the upper surface of antenna substrate 110 (S812). The RFIC chips 150, other IC chips 160 and TL section(s) 180 may be placed on antenna substrate 110 (S814). A heating/cooling cycle may be performed to melt and cool solder or other conductive material of the conductive joints 363 and conductively adhere the RFIC chips, other IC chips, and the TL section(s) to the antenna substrate (S816). Upper surface interconnects 141 such as wirebonds or ribbon bonds may then be attached on opposite ends to RFIC chip conductors 151 or 551 and the TL section 180 conductors (branch arms) to interconnect the same (S818). A connector 170 may be attached to TL section 180, and a cover 107 or PWA may be attached to the resulting assembly (S820).

The above-described embodiments have been described in the context of antenna apparatus 100. Other implementations of the technology disclosed herein may be applied to non-antenna applications or to interconnect configurations in other parts of an antenna system. For instance, in other example configurations, antenna elements 125 are substituted with at least one other type of circuit components, e.g., second IC chips such as modems. The RFIC chips 150 may be coupled to the second IC chips using the same or similar interconnection structures as described above (e.g., using first vias 155, second vias 355, etc.). In such embodiments, RFIC chips 150 may be interconnected from the active die side to transmission line section 180 in the same manner as described herein, albeit transmission line section 180 may support circuitry other than a combiner/divider of a beamforming network. In other cases, transmission line section may be substituted with another RF circuit component, such as another RFIC chip configured to perform a function different from those of RFICs 150. The resulting configuration/electronic device is formed in a compact three dimensional stacked structure with analogous advantages to those described for antenna 100, e.g., a reduction in loss, a reduction/elimination of oscillations, and/or ease of fabrication.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An antenna apparatus comprising:
an antenna substrate having opposite first and second surfaces;
at least one antenna element disposed at the first surface of the antenna substrate;
at least one radio frequency integrated circuit (RFIC) chip having a lower surface attached to the second surface of the antenna substrate, the lower surface having an RF contact coupled to the at least one antenna element through the antenna substrate, the RFIC chip having an RF signal conductor at an upper surface thereof and beamforming circuitry coupled between the RF contact and the RF signal conductor; and
a transmission line section having a lower surface attached to the second surface of the antenna substrate, an upper surface at which a transmission line conductor is disposed and electrically connected to the RF signal conductor of the RFIC chip through an upper surface interconnect, and a dielectric substrate between the lower and upper surfaces of the transmission line section.

2. The antenna apparatus of claim 1, wherein:
the antenna substrate includes an antenna ground plane proximate to or forming at least a part of the second surface, the antenna ground plane being electrically connected to a ground contact of the RFIC chip; and
the RF contact of the RFIC chip is coupled to the at least one antenna element through an opening in the antenna ground plane.

3. The antenna apparatus of claim 2, wherein the antenna substrate further comprises a redistribution layer between the antenna ground plane and the second surface, for providing a DC voltage and/or a control signal to the RFIC chip.

4. The antenna apparatus of claim 1, wherein the upper surface of the RFIC chip is an active die side of the RFIC chip.

5. The antenna apparatus of claim 4, wherein the RFIC chip comprises a via connecting the RF contact to the active die side.

6. The antenna apparatus of claim 1, wherein the antenna substrate includes a via formed therein, the via electrically or electromagnetically coupling the RF contact to the at least one antenna element.

7. The antenna apparatus of claim 6, wherein the lower surface of the RFIC chip is attached to the second surface of the antenna substrate through a plurality of electrical connection joints, with one of the electrical connection joints coupling the RF contact to the via.

8. The antenna apparatus of claim 7, wherein the plurality of electrical connection joints comprise solder bumps, copper pillars, gold bumps, conductive epoxy joints or thermo-compression bonding joints.

9. The antenna apparatus of claim 7, further comprising underfill material in spaces surrounding the electrical connection joints between the second surface of the antenna substrate and the lower surface of the RFIC chip.

10. The antenna apparatus of claim 1, wherein the upper surface interconnect is a wirebond, a ribbon bond or an edge contact pair.

11. The antenna apparatus of claim 1, wherein the beamforming circuitry comprises at least one of a transmit amplifier, a receive amplifier and a phase shifter for adjusting a signal communicated between the RFIC chip and the at least one antenna element.

12. The antenna apparatus of claim 1, wherein the transmission line section comprises at least a portion of a beamforming network (BFN) that divides an input transmit signal into a plurality of divided transmit signals each provided to one of a plurality of RFIC chips attached to the antenna substrate, and/or receives a plurality of receive signals from the plurality of RFIC chips, respectively, and combines the receive signals to form an output signal.

13. The antenna apparatus of claim 1, wherein the dielectric substrate comprises an alumina substrate attached to the second surface of the antenna substrate.

14. The antenna apparatus of claim 1, wherein:
the transmission line conductor of the transmission line section is a signal conductor of a coplanar transmission line having first and second ground conductors on opposite sides of the signal conductor; and
third and fourth ground conductors of the RFIC chip at the upper surface of the RFIC chip are interconnected to the first and second ground conductors, respectively, of the coplanar transmission line, through respective upper surface interconnects.

15. The antenna apparatus of claim 1, wherein:
the beamforming circuitry of the RFIC chip is configured in a microstrip medium comprising a microstrip ground plane at the lower surface of the RFIC chip; and the RFIC chip further comprises first and second ground vias respectively connecting the third and fourth ground conductors to the microstrip ground plane.

16. The antenna apparatus of claim 1, wherein the transmission line section is a microstrip transmission line comprising: the dielectric substrate; the transmission line conductor at an upper surface of the dielectric substrate; and a microstrip ground plane at a lower surface of the dielectric substrate.

17. The antenna apparatus of claim 1, wherein the at least one antenna element is a microstrip patch element.

18. The antenna apparatus of claim 1, wherein:

the at least one antenna element comprises a plurality N antenna elements; and the RFIC chips include N beamforming circuits each including at least one of an amplifier and a phase shifter, wherein the N beamforming circuits are coupled to the N antenna elements through N vias formed within the antenna substrate, respectively.

19. A phased array antenna comprising:

an antenna substrate having opposite first and second surfaces;

a plurality of antenna elements disposed at the first surface of the antenna substrate;

a plurality of radio frequency integrated circuit (RFIC) chips each having a lower surface attached to the second surface of the antenna substrate and each said lower surface having an RF contact coupled to at least one of the antenna elements through the antenna substrate, the RFIC chips each having an RF signal conductor at an upper surface thereof and beamforming circuitry for beam steering coupled between the respective RF contact and the RF signal conductor; and at least one transmission line section disposed between the RFIC chips, and comprising a lower surface attached to the second surface of the antenna substrate, and an upper surface at which a portion of a beamforming network (BFN) including a plurality of branch arm conductors are disposed, each branch arm conductor being interconnected to an RF signal conductor of a respective one of the RFIC chips through an upper surface interconnect.

20. The phased array antenna of claim 19, wherein:

the BFN further comprises a plurality of amplifiers and a plurality of phase shifters, wherein the beamforming circuitry of each said RFIC chip comprises at least one of the amplifiers and at least one of the phase shifters;

the antenna substrate further comprises an antenna ground plane and a layer region, comprising a plurality of conductive lines, between the antenna ground plane and the second surface, for routing DC voltages to the amplifiers and control signals to the phase shifters for controlling respective phases and implementing beam steering; and the phased array antenna further comprises a plurality of integrated circuit (IC) chips attached to the second surface of the antenna substrate, coupled to the layer region, for providing at least the control signals.

* * * * *